US012081129B2

(12) United States Patent
Sato et al.

(10) Patent No.: US 12,081,129 B2
(45) Date of Patent: Sep. 3, 2024

(54) POWER CONTROL DEVICE, DC-DC CONVERTER, AND AC-DC CONVERTER

(71) Applicant: Rohm Co., Ltd., Kyoto (JP)

(72) Inventors: Yoshinori Sato, Kyoto (JP); Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 179 days.

(21) Appl. No.: 17/799,449

(22) PCT Filed: Oct. 29, 2020

(86) PCT No.: PCT/JP2020/040618
§ 371 (c)(1),
(2) Date: Aug. 12, 2022

(87) PCT Pub. No.: WO2021/171700
PCT Pub. Date: Sep. 2, 2021

(65) Prior Publication Data
US 2023/0062534 A1    Mar. 2, 2023

(30) Foreign Application Priority Data

Feb. 27, 2020 (JP) .................................. 2020-031188

(51) Int. Cl.
*H02M 3/335* (2006.01)
*H02M 1/08* (2006.01)

(52) U.S. Cl.
CPC ......... *H02M 3/33507* (2013.01); *H02M 1/08* (2013.01)

(58) Field of Classification Search
CPC ........ H02M 1/08; H02M 1/081; H02M 1/082; H02M 3/33507; H02M 3/33515; H02M 3/33523; H02M 3/335; H02M 3/33155; H02M 3/315; H02M 3/3353
See application file for complete search history.

(56) References Cited

U.S. PATENT DOCUMENTS

| | | | |
|---|---|---|---|
| 2006/0250121 A1 | 11/2006 | Tzeng et al. | |
| 2013/0294118 A1* | 11/2013 | So | H02M 3/33507 363/21.16 |
| 2016/0087542 A1* | 3/2016 | Warnes | H02M 1/32 363/21.05 |
| 2018/0287481 A1 | 10/2018 | Liu et al. | |
| 2024/0014741 A1* | 1/2024 | Imade | H02M 3/33507 |

FOREIGN PATENT DOCUMENTS

| | | |
|---|---|---|
| JP | 2006-333616 | 12/2006 |
| JP | 2019068684 | 4/2019 |

OTHER PUBLICATIONS

International Search Report in International Appln. No. PCT/JP2020/040618, dated Jan. 12, 2021, 5 pages (with English Translation).

* cited by examiner

*Primary Examiner* — Nguyen Tran
(74) *Attorney, Agent, or Firm* — Fish & Richardson P.C.

(57) ABSTRACT

A power control device includes a mode setter configured to effect a change from a normal mode to a low-power mode upon detecting a light load in a burst operation, and a minimum on-period setter configured to, in response to a change to the low-power mode, change the minimum on-period of the switching transistor from a first minimum on-period to a second minimum on-period longer than the first minimum on-period.

10 Claims, 7 Drawing Sheets

POWER CONTROL DEVICE, DC-DC CONVERTER, AND AC-DC CONVERTER

TECHNICAL FIELD

The present invention relates to a power control device for an insulation-type DC-DC converter.

BACKGROUND ART

Flyback DC-DC converters are conventionally used as power supply circuits for use in AC-DC converters and the like. The flyback converter (a DC-DC converter of a flyback type) is an isolation-type DC-DC converter.

One example of such flyback converters is disclosed in Patent Document 1. The flyback converter disclosed in Patent Document 1 has a function of operating in an intermittent mode (burst mode) to suppress a drop in efficiency due to switching loss under a light load condition.

LIST OF CITATIONS

Patent Literature

Patent Document 1: Japanese unexamined patent application publication No. 2019-68684

SUMMARY OF THE INVENTION

Problem to be Solved by the Invention

At present, with respect to the flyback converter as mentioned above, there is demand for further improvement in efficiency during the operation in the intermittent mode.

In view of the situation described above, the present invention is aimed at providing a power control device that can improve efficiency under a light load.

Means for Solving the Problem

According to one aspect of what is disclosed herein, a power control device is one for use in an insulation-type DC-DC converter. The DC-DC converter includes: a transformer having a primary winding and a secondary winding; and a switching transistor connected to the primary winding. The power control device includes: a control pulse generator configured to generate a control pulse signal with a duty in accordance with a feedback signal generated based on the output voltage of the DC-DC converter to drive and control the switching transistor based on the control pulse signal; and a burst comparator configured to compare the feedback signal with a threshold value to generate a burst enable signal as the comparison result. The control pulse generator is configured to alternate between driving and not driving the switching transistor in accordance with the level of the burst enable signal to perform a burst operation in which switching is performed intermittently in the switching transistor. The power control device further includes: a mode setter configured to, upon detecting a light load in the burst operation, change the mode from a normal mode to a low-power mode; and a minimum on-period setter configured to, when the mode is changed to the low-power mode, change the minimum on-period of the switching transistor from a first minimum on-period to a second minimum on-period longer than the first minimum on-period (a first configuration).

In the first configuration described above, preferably, the mode setter is configured to detect a light load by counting the number of pulses in the control pulse signal during a burst disabled period in which the switching transistor is driven (a second configuration).

In the second configuration described above, preferably, the mode setter is configured to, after the mode is changed to the low-power mode, count the number of pulses in the control pulse signal during the burst disabled period and, when the number of pulses reaches a predetermined number, change the mode to the normal mode immediately (a third configuration).

In the second or third configuration described above, preferably, the mode setter includes: a first counter configured to count the number of pulses to switch between a reset state and a reset-released state in accordance with the burst enable signal; a first D flip-flop having a clock terminal fed with a signal based on the output of the first counter, a D terminal fed with a supply voltage, and a reset terminal fed with the burst enable signal; a first inverter configured to invert the level of the Q output of the first D flip-flop; a second inverter configured to invert the level of the burst enable signal; and a second D flip-flop having a D terminal fed with an output of the first inverter and a clock terminal fed with the output of the second inverter (a fourth configuration).

In the fourth configuration described above, preferably, the mode setter further includes: an AND circuit fed with the burst enable signal and the Q output of the second D flip-flop; a second counter configured to count the number of pulses to switch between a reset state and a reset-released state in accordance with the output of the AND circuit; a third inverter configured to invert the level of the output of the second counter; and an OR circuit fed with the outputs of the first and second counters. The output of the OR circuit is fed to the clock terminal of the first D flip-flop. The output of the third inverter is fed to the reset terminal of the second D flip-flop (a fifth configuration).

In the first configuration described above, preferably, the mode setter is configured to detect a light load by measuring a burst period comprising the burst disabled period in which the switching transistor is driven and a burst enabled period in which the switching transistor is not driven (a sixth configuration).

In the sixth configuration described above, preferably, the mode setter is configured to, after the mode is changed to the low-power mode, start to measure the burst disabled period and, if the burst disabled period measured is equal to or longer than a predetermined time, change the mode to the normal mode (a seventh configuration).

The power control device according to any of the first to seventh configurations described above, preferably, further includes an alternating-current voltage detector configured to detect the level of an alternating-current voltage fed in to the stage preceding the DC-DC converter. The minimum on-period setter is configured to set the minimum on-period in accordance with the level of the alternating-current voltage detected (an eighth configuration).

According to another aspect of what is disclosed herein, a DC-DC converter of a flyback type includes a transformer, a switching transistor, and the power control device according to any of the first to eighth configurations described above (a ninth configuration).

According to yet another aspect of what is disclosed herein, an AC-DC converter includes a diode bridge fed with an alternating-current voltage, a capacitor provided in the stage succeeding the diode bridge, and the DC-DC converter according to the ninth configuration described above.

Advantageous Effects of the Invention

With a power control device disclosed herein, it is possible to improve efficiency under a light load.

DESCRIPTION OF EMBODIMENTS

Exemplary embodiments of the present invention will be described below with reference to the accompanying drawings.

<Configuration of an AC-DC Converter>

Figure 1:
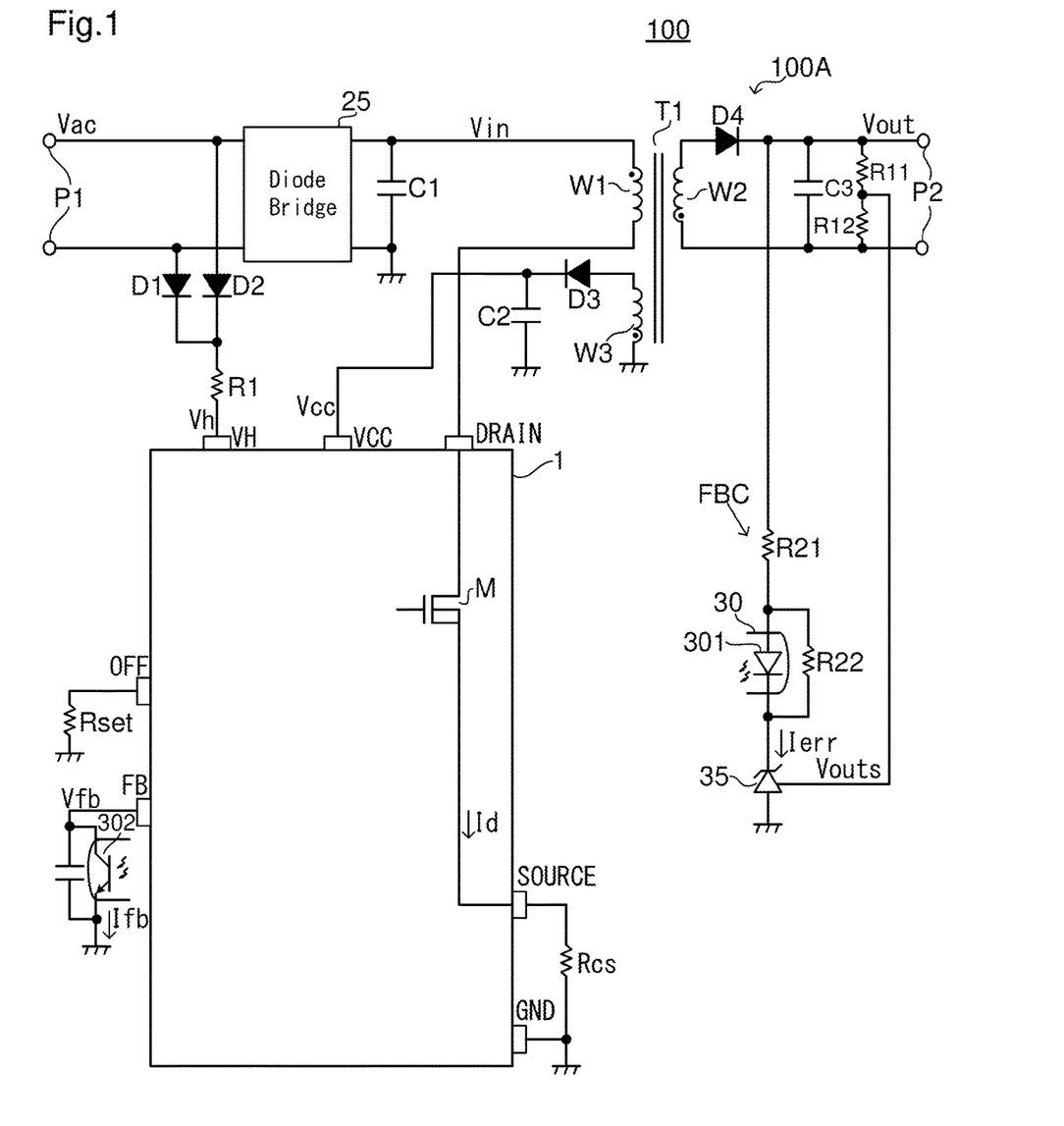
FIG. 1 is a diagram showing a configuration of an AC-DC converter according to an exemplary embodiment of the present invention.

FIG. 1 is a diagram showing a configuration of an AC-DC converter 100 according to an exemplary embodiment of the present invention. The AC-DC converter 100 includes, roughly divided, a diode bridge 25, a capacitor C1, diodes D1 and D2, and a resistor R1 which constitute an input stage, and a flyback converter 100A which is arranged in the stage succeeding the input stage.

The diode bridge 25 performs full-wave rectification on an alternating-current voltage Vac fed to input terminals P1 and outputs a rectified voltage. The capacitor C1 smooths the voltage fed from the diode bridge 25 to generate an input voltage Vin, which is a direct-current.

The flyback converter 100A is a DC-DC converter of a flyback type, and is an isolation-type switching power supply circuit. The flyback converter 100A converts the input voltage Vin to a direct-current output voltage Vout that is stabilized at a target voltage and feeds it to a load (not shown) connected to an output terminal P2.

The flyback converter 100A includes a transformer T1, diodes D3 and D4, a smoothing capacitor C2, an output capacitor C3, voltage division resistors R11 and R12, resistors R21 and R22, a photocoupler 30, a shunt regulator 35, and a power control device 1. The flyback converter 100A also includes a sense resistor Rcs and a setting resistor Rset that are externally connected to a power control device 1.

The power control device 1 is an IC as a primary side controller and incorporates a switching transistor M. Here, the switching transistor may be externally connected to the IC. The power control device 1 includes external terminals for establishing electrical connection with the outside, namely a VH terminal, a VCC terminal, a DRAIN terminal, a SOURCE terminal, an FB terminal, an OFF terminal, and a GND terminal.

The transformer T1 includes a primary winding W1 and a secondary winding W2. One terminal of the primary winding W1 is connected to an application terminal for the input voltage Vin. The other terminal of the primary winding W1 is connected via the DRAIN terminal to the drain of the switching transistor M, which is configured as an NMOS transistor. The source of the switching transistor M is connected via the SOURCE terminal to one terminal of the sense resistor Rcs outside the IC. The other terminal of the sense resistor Rcs is connected to a grounded terminal. The sense resistor Rcs is an element for sensing a current Id passing through the switching transistor M.

The anode of the diode D4 is connected to one terminal of the secondary winding W2. The cathode of the diode D4 is connected to one terminal of the capacitor C3. The diode D4 and the output capacitor C3 rectify and smooth the current passing through the secondary winding W2 to generate the output voltage Vout.

The flyback converter 100A operates as follows. First, when the switching transistor M is turned on, the current Id passes through the primary winding W1 and that produces a magnetic flux, causing energy to be stored in the transformer T1. Here, the secondary diode D4 is off. Then, when the switching transistor M is turned off, energy stored in the transformer T1 is released, and a current passes via the diode D4, which is now on.

The flyback converter 100A includes a feedback circuit FBC. The feedback circuit FBC includes the voltage division resistors R11 and R12, the resistors R21 and R22, the photocoupler 30, and the shunt regulator 35.

The output voltage Vout is divided by the voltage division resistors R11 and R12 into a division voltage Vouts, which is fed to the shunt regulator 35. The shunt regulator 35 generates a current Ierr commensurate with the difference between the fed division voltage Vouts and a predetermined target voltage and drives a light emitting element 301 in the photocoupler 30 with the current Ierr. The light emitting element 301 is biased by the resistors R21 and R22. Through a light receiving element 302 in the photocoupler 30 passes a feedback current Ifb commensurate with the difference described above. At the FB terminal, a feedback signal (voltage signal) Vfb commensurate with the feedback current Ifb appears. The power control device 1 performs PWM operation to generate a control pulse signal with a duty adjusted based on the feedback signal Vfb and turns on and off the switching transistor M based on the control pulse signal.

On the primary side of the transformer T1, an auxiliary winding W3 is provided. The diode D3 and the smoothing capacitor C2 rectify and smooth a current passing through the auxiliary winding W3 to generate a primary side supply voltage Vcc. The supply voltage Vcc is fed to the VCC terminal of the power control device 1.

The anode of the diode D1 is connected to one of the input terminals P1, and the anode of the diode D2 is connected to the other of the input terminals P1. The cathodes of the diodes D1 and D2 are together connected to one terminal of the resistor R1. The other terminal of the resistor R1 is connected to the VH terminal.

When the alternating-current voltage Vac starts to be applied, owing to the diodes D1 and D2 and the resistor R1, a high voltage Vh is fed to the VH terminal. The high voltage Vh is used to charge the smoothing capacitor C2 during start-up.

One terminal of the setting resistor Rset is connected to the OFF terminal. The setting resistor Rset is used for setting a minimum on-period in switching, which will be described later.

<Configuration of the Power Control Device>

Figure 2:
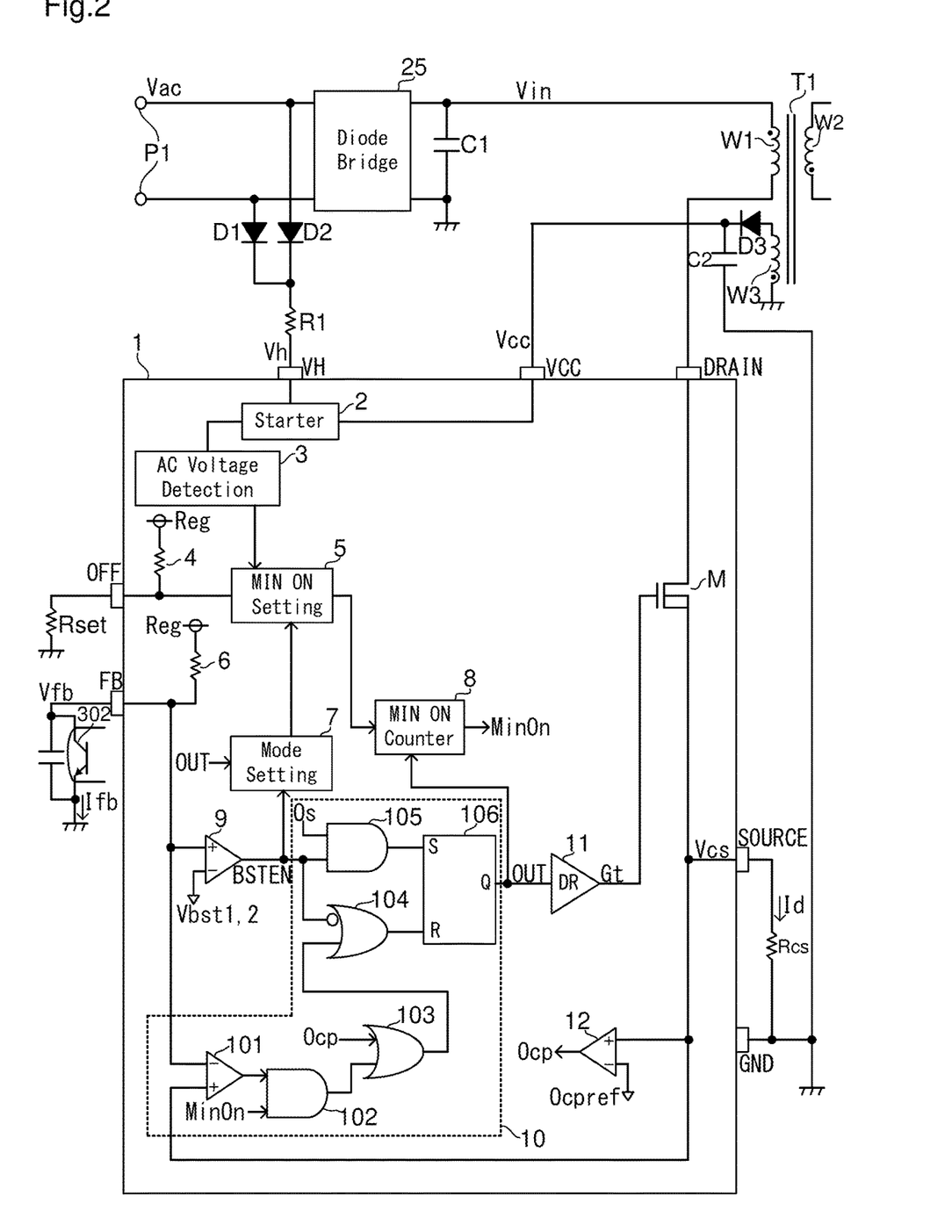
FIG. 2 is a diagram showing an example of an internal configuration of a power control device.

Next, a configuration of the power control device 1 will be described in more detail. FIG. 2 is a diagram showing an example of an internal configuration of the power control device 1.

As shown in FIG. 2, the power control device 1 has, integrated on a single chip, a starting circuit 2, an alternating-current voltage detector 3, a pull-up resistor 4, a minimum on-period setter 5, a pull-up resistor 6, a mode setter 7, a minimum on-period counter 8, a burst comparator 9, a control pulse generator 10, a driver 11, an OCP (overcurrent protection) comparator 12, and a switching transistor M.

When the alternating-current voltage Vac starts to be applied, a high voltage Vh is fed to the VH terminal. Here, a current passes through the starting circuit 2 via the VCC terminal to charge the smoothing capacitor C2. When the supply voltage Vcc rises until the VCC UVLO is released, charging is stopped.

The alternating-current voltage detector 3, by sensing the peak voltage of the high voltage Vh, senses the level of the alternating-current voltage Vac (for example, AC 100 V, AC 230 V, etc.). The sensed peak voltage is used to set the minimum on-period in the minimum on-period setter 5.

To one terminal of the pull-up resistor 4, an internal supply voltage Reg is applied. The internal supply voltage Reg is generated based on the supply voltage Vcc by an internal supply voltage generator (not shown) in the power control device 1. The other terminal of the pull-up resistor 4 is connected via the OFF terminal to one terminal of the setting resistor Rset. The other terminal of the setting resistor Rset is connected to the grounded terminal.

The minimum on-period setter 5 sets a first minimum on-period Tmin1 based on the sensing result from the alternating-current voltage detector 3. The minimum on-period setter 5 also sets a second minimum on-period Tmin2 based on the resistance value of the setting resistor Rset (which can be in an open state) and the sensing result by the alternating-current voltage detector 3. The second minimum on-period Tmin2 is longer than the first minimum on-period Tmin1. As will be described later, the first minimum on-period Tmin1 is a set value used in a normal mode, and the second minimum on-period Tmin2 is a set value used in a low-power mode.

One terminal of the pull-up resistor 6 is fed with the internal supply voltage Reg. The other terminal of the pull-up resistor 6 is connected via the FB terminal to the light receiving element 302. The feedback current Ifb passing through the light receiving element 302 produces the feedback signal Vfb, expressed by the formula below, at the FB terminal.

$$Vfb = Reg - R \cdot Ifb \text{ (where } R \text{ represents the resistance value of the pull-up resistor 6)}$$

The non-inverting input terminal (+) of the burst comparator 9 is fed with the feedback signal Vfb. The inverting input terminal (−) of the burst comparator 9 is fed with burst threshold voltages Vbst1 and Vbst2. The burst comparator 9 compares the feedback signal Vfb with the burst threshold voltages Vbst1 and Vbst2 and outputs, as the comparison result, a burst enable signal BSTEN. The burst comparator 9 is a hysteresis comparator, and the burst threshold voltages have the relationship Vbst2>Vbst1.

When the feedback signal Vfb increases above the burst threshold voltage Vbst2, so long as it does not decrease below the burst threshold voltage Vbst1, the burst enable signal BSTEN is at high level, which indicates a burst disabled state. When the feedback signal Vfb decreases below the burst threshold voltage Vbst1, so long as it does not increase above the burst threshold voltage Vbst2, the burst enable signal BSTEN is at low level, which indicates a burst enabled state.

At the SOURCE terminal, a current sense signal Vcs appears which is obtained by submitting the current Id passing through the switching transistor M to current-to-voltage conversion by the sense resistor Rcs.

The control pulse generator 10 includes a PWM comparator 101, an AND circuit 102, an OR circuit 103, an OR circuit 104, an AND circuit 105, and a flip-flop 106.

The non-inverting input terminal (+) of the PWM comparator 101 is fed with the current sense signal Vcs. The inverting input terminal (−) of the PWM comparator 101 is fed with the feedback signal Vfb. The PWM comparator 101 compares the current sense signal Vcs with the feedback signal Vfb to output the result of the comparison to the first input terminal of the AND circuit 102.

The minimum on-period counter 8 counts the minimum on-period set by the minimum on-period setter 5. The second input terminal of the AND circuit 102 is fed with a counter output MinOn fed from the minimum on-period counter 8. The first input terminal of the OR circuit 103 is fed with the output of the AND circuit 102.

The non-inverting input terminal (+) of an OCP comparator 12 is fed with the current sense signal Vcs. The inverting input terminal (−) of the OCP comparator 12 is fed with a reference voltage Ocpref. The OCP comparator 12 compares the current sense signal Vcs with the reference voltage Ocpref to output an OCP signal Ocp as the result of the comparison. The OCP signal Ocp is fed to the second input terminal of the OR circuit 103.

The output of the OR circuit 103 is fed to the first input terminal of the OR circuit 104. The second input terminal of the OR circuit 104 is fed with the burst enable signal BSTEN with its logic level inverted. The output of the OR circuit 104 is fed to the reset terminal (R) of the flip-flop 106.

The first input terminal of the AND circuit 105 is fed with an oscillation signal Os. The oscillation signal Os is a pulse signal of a predetermined frequency. The predetermined frequency determines the switching frequency of the switching transistor M.

The second input terminal of the AND circuit 105 is fed with the burst enable signal BSTEN. The output of the AND circuit 105 is fed to the set terminal (S) of the flip-flop 106. From the Q output terminal of the flip-flop 106, a control pulse signal OUT is output. The driver 11, based on the control pulse signal OUT, feeds a gate signal Gt to the gate of the switching transistor M. When the control pulse signal OUT is at high level, the gate signal Gt is at high level, and the switching transistor M is on. When the control pulse signal OUT is at low level, the gate signal Gt is at low level, and the switching transistor M is off.

Now, the operation of the control pulse generator 10 will be described. Suppose that the burst enable signal BSTEN is at high level (in the burst disabled state). Here, when the oscillation signal Os rises to high level, the flip-flop 106 is set, and the control pulse signal OUT rises to high level. Thus, the minimum on-period counter 8 is reset and the counter output MinOn falls to low level. Here, the driver 11 turns the gate signal Gt to high level, and the switching transistor M turns on into an on state.

Then, the current Id starts to pass through the switching transistor M, and the current sense signal Vcs starts to rise from 0 V. Then, when the current sense signal Vcs becomes higher than the feedback signal Vfb, the output of the PWM comparator 101 turns to high level. Here, the minimum on-period counter 8 is reset and starts counting the minimum on-period and, on completing the counting, raises the counter output MinOn to high level. If, when the output of the PWM comparator 101 turns to high level, the counter output MinOn is still at low level, when, thereafter, the counter output MinOn rises to high level, the output of the AND circuit 102 turns to high level. In this way, the on-period of the switching transistor M is ensured to be equal to or longer than the minimum on-period.

The OR circuit 103 outputs high level when either the OCP signal Ocp or the output of the AND circuit 102 turns to high level. When the output of the OR circuit 103 turns to high level, the output of the OR circuit 104 turns to high level, and the flip-flop 106 is reset and the control pulse signal OUT falls to low level. Thus, the driver 11 turns the gate signal Gt to low level, and the switching transistor M is turned off into an off state.

Then, when the oscillation signal Os rises to high level, the flip-flop 106 is set again, and the control pulse signal OUT rises to high level.

In this way, when the burst enable signal BSTEN is at high level (in the burst disabled state), through PWM control by the PWM comparator 101, a control pulse signal OUT with a duty adjusted is generated, and the switching transistor M is driven to turn on and off.

By contrast, when the burst enable signal BSTEN is at low level (in the burst enabled state), the output of the AND circuit 105 is at low level regardless of the oscillation signal Os, the output of the OR circuit 104 is at high level regardless of the output of the OR circuit 103, the flip-flop 106 remains in a reset state, and the control pulse signal OUT remains at low level. Thus, the gate signal Gt remains at low level, and thus the switching transistor M remains off and switching is suspended.

Here, under a light load, the flyback converter 100A operates in a burst mode (an intermittent mode) in which the burst disabled state where switching is performed in the switching transistor M and the burst enabled state where switching is suspended in the switching transistor M alternate. This helps suppress a drop in efficiency due to switching loss under a light load.

The mode setter 7 is a circuit that sets either the normal mode or the low-power mode based on the burst enable signal BSTEN and the control pulse signal OUT. The minimum on-period setter 5 switches, in accordance with the mode set by the mode setter 7, between the first and second minimum on-periods Tmin1 and Tmin2 as the minimum on-period for counting the minimum on-period counter 8.

<Mode Setting>

Figure 3:
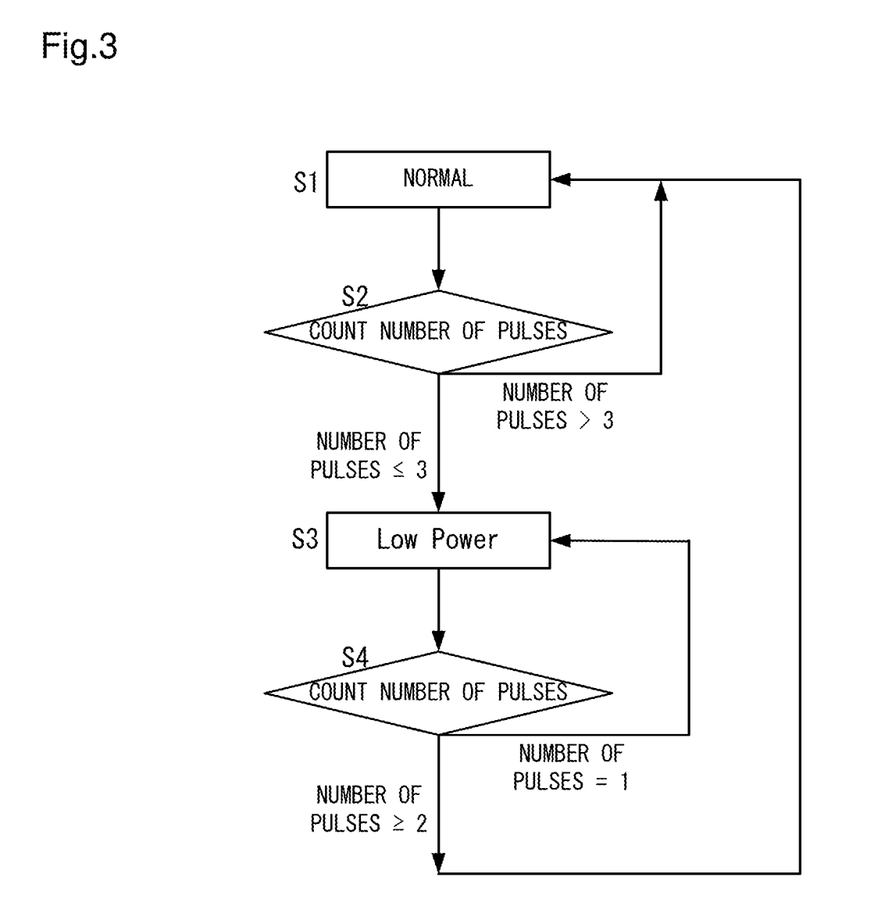
FIG. 3 is a flow chart illustrating a procedure of the operation of a mode setter.

Next, the mode setter 7 will be described in detail. FIG. 3 is a flow chart illustrating a procedure of the operation of the mode setter 7.

In step S1, with the mode set to the normal mode, in the burst disabled state, the control pulse signal OUT is generated. In step S2, the mode setter 7 counts the number of pulses in the control pulse signal OUT. Here, the minimum on-period of the switching transistor M is set to the first minimum on-period Tmin1.

If the number of pulses counted in the burst disabled state is larger than three (one example of a first predetermined number of pulses), (that is, when the number of pulses has reached four), the procedure returns to step S1, where the mode setter 7 sets the mode to the normal mode. By contrast, if the number of pulses counted is equal to or smaller than three (that is, when the number of pulses has not reached four), it is judged that a light load has been detected, and, in step S3, the mode setter 7 sets the mode to the low-power mode. In this case, the minimum on-period setter 5 sets, as the minimum on-period counted by the minimum on-period counter 8, the second minimum on-period Tmin2.

Thus, when the control pulse signal OUT is produced on recurrence of the burst disabled state after the burst enabled state, switching is performed in the switching transistor M with the minimum on-period set to the second minimum on-period Tmin2.

In the low-power mode, the minimum on-period is set to the second minimum on-period Tmin2 longer than the first minimum on-period Tmin1; thus, the amount of electric power output by switching increases, and a burst period (see Tbst in FIG. 5 referred to later), which is a unit period comprising the period of the burst disabled state (a burst disabled period) and the period of the burst enabled state (a burst enabled period), becomes longer. This reduces the number of switching in a predetermined period and reduces the switching loss. It is thus possible to improve efficiency in a standby state with low power consumption. In addition, the longer burst period permits the frequency ascribable to the burst period to be lowered out of the audible band.

In step S4, the mode setter 7 counts the number of pulses in the control pulse signal OUT during the burst disabled period. If the number of pulses counted is one (that is, when the number of pulses has not reached two), the procedure returns to step S3, where the mode setter 7 sets the mode to the low-power mode.

By contrast, if the number of pulses counted is equal to or larger than two (that is, when the number of pulses has reached two), the procedure returns to step S1, where the mode setter 7 sets the mode to the normal mode. Here, the mode is reset to the normal mode immediately after the number of pulses counted reaches two. In this way, when, for example, the load becomes heavy abruptly, it is possible to reset the mode to the normal mode immediately.

Figure 4:
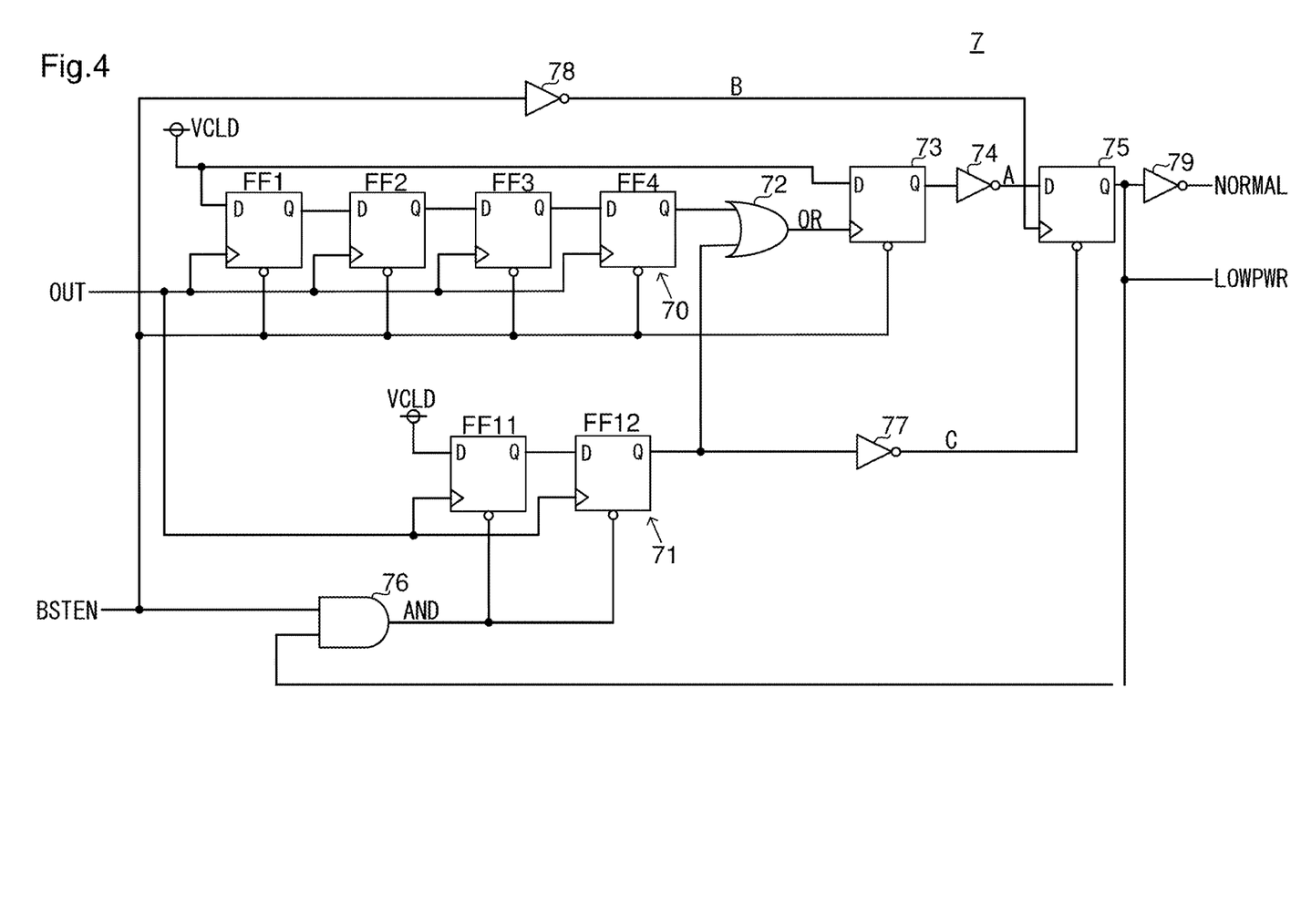
FIG. 4 is a circuit diagram showing one configuration example of the mode setter.

FIG. 4 is a circuit diagram showing one configuration example of the mode setter 7. The mode setter 7 shown in FIG. 4 includes a first counter 70 that counts the control pulse signal OUT, a second counter 71 that counts the control pulse signal OUT, an OR circuit 72, a D flip-flop 73, an inverter 74, a D flip-flop 75, an AND circuit 76, an inverter 77, an inverter 78, and an inverter 79.

The first counter 70 is composed of D flip-flops FF1 to FF4. The D flip-flops FF1 to FF4 are arranged in this order from the front to final stages. The clock terminals of the D flip-flops FF1 to FF4 are each fed with the control pulse signal OUT. The D terminal of the D flip-flop FF1 is fed with the supply voltage VCLD. Among the D flip-flops FF1 to FF4, the Q terminal in one stage is connected to the D terminal in the preceding stage. The reset terminals of the D flip-flops FF1 to FF4 are each fed with the burst enable signal BSTEN.

Thus, when the D flip-flops FF1 to FF4 are released from the reset state, the control pulse signal OUT starts to be counted, and, when four control pulse signals OUT are counted, a signal that has been turned to high level is output from the Q terminal of the D flip-flop FF4.

The second counter 71 is composed of D flip-flops FF11 and FF12. The D flip-flops FF11 and FF12 are arranged in this order from the front to final stages. The clock terminals of the D flip-flops FF11 and FF12 are each fed with the control pulse signal OUT. The D terminal of the D flip-flop FF11 is fed with the supply voltage VCLD. The Q terminal of the D flip-flop FF11 is connected to the D terminal of the D flip-flop FF12. The reset terminals of the D flip-flops FF11 to FF12 are each fed with the output of the AND circuit 76.

When the D flip-flops FF11 and FF12 are released from the reset state, the control pulse signal OUT starts to be counted, and, when two pulses in the control pulse signal OUT are counted, a signal now at high level is output from the Q terminal of the D flip-flop FF12.

The first input terminal of the OR circuit 72 is fed with the output from the Q terminal of the D flip-flop FF4. The second input terminal of the OR circuit 72 is fed with the output from the Q terminal of the D flip-flop FF12.

The output of the OR circuit 72 is applied to the clock terminal of the D flip-flop 73. The D terminal of the D flip-flop 73 is fed with the supply voltage VCLD. The reset terminal of the D flip-flop 73 is fed with the burst enable signal BSTEN.

The output from the Q terminal of the D flip-flop 73 is fed to the inverter 74. The output of the inverter 74 is fed to the D terminal of the D flip-flop 75. The clock terminal of the D flip-flop 75 is fed with the burst enable signal BSTEN via the inverter 78.

The reset terminal of the D flip-flop 75 is fed with the output from the Q terminal of the D flip-flop FF12 via the inverter 77. The output from the Q terminal of the D flip-flop 75 is a low-power mode signal LOWPWR and is fed to the first input terminal of the AND circuit 76. The second input terminal of the AND circuit 76 is fed with the burst enable signal BSTEN. A signal resulting from inverting the logic level of the output from the Q terminal of the D flip-flop 75 with the inverter 79 is a normal mode signal NORMAL.

The minimum on-period setter 5 (FIG. 2) may be made to output the normal mode signal NORMAL or the low-power mode signal LOWPWR. Either signal can notify the minimum on-period setter 5 of the set mode.

Figure 5:
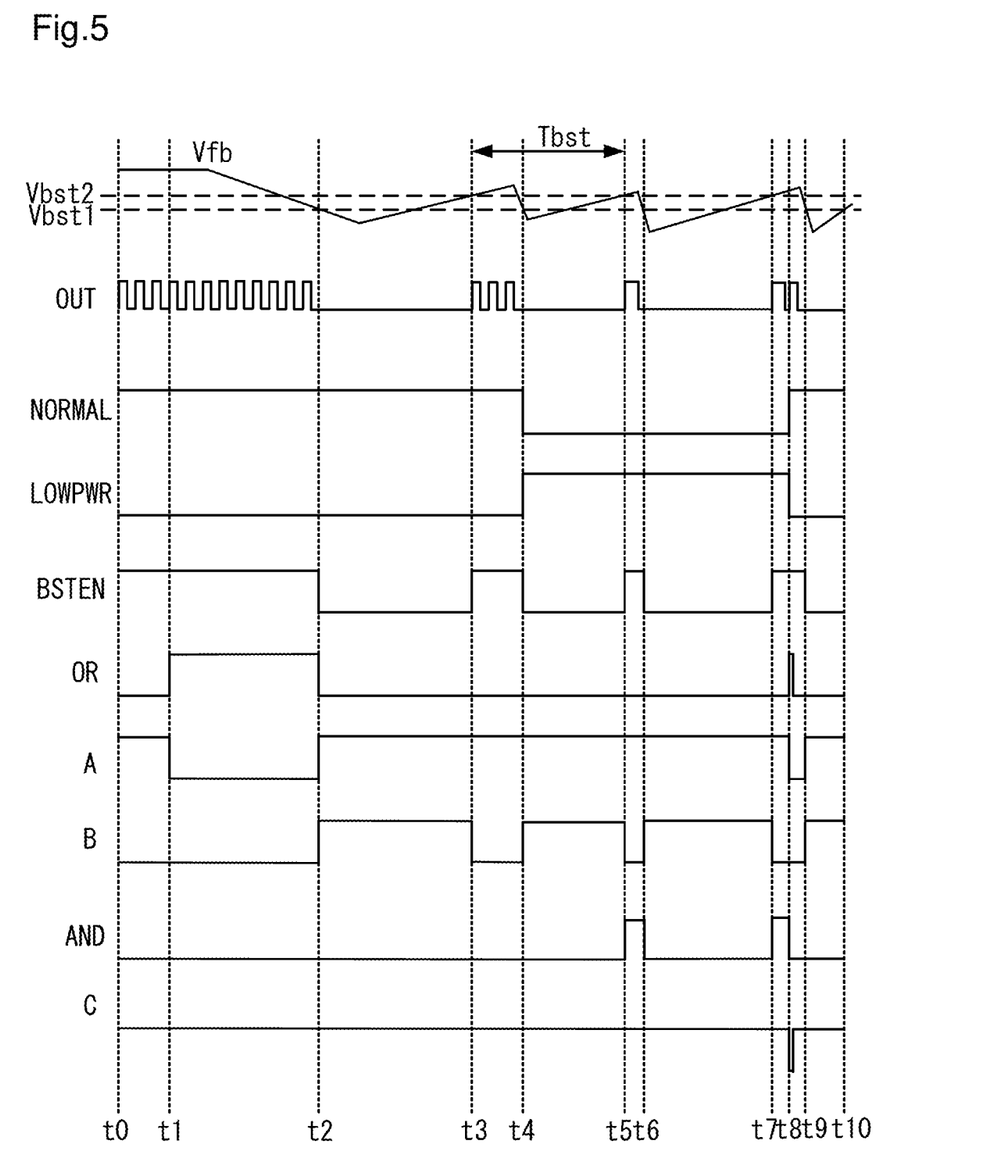
FIG. 5 is a timing chart showing an example of the operation of the mode setter shown in FIG. 4.

FIG. 5 is a timing chart showing an example of the operation of the mode setter 7 shown in FIG. 4. FIG. 5 shows the waveforms of, from top down, the feedback signal Vfb, the control pulse signal OUT, the normal mode signal NORMAL, the low-power mode signal LOWPWR, the burst enable signal BSTEN, the output OR of the OR circuit 72, the output A of the inverter 74, the output B of the inverter 78, the output AND of the AND circuit 76, and the output C of the inverter 77. Along with the feedback signal Vfb, the burst threshold voltages Vbst1 and Vbst2 are shown.

At time point t0 shown in FIG. 5, the feedback signal Vfb is higher than the burst threshold voltage Vbst2; thus, the burst enable signal BSTEN is at high level (in the burst disabled state). Thus, the first counter 70 and the D flip-flop 73 are in a reset-released state. The normal mode signal NORMAL is at high level, that is, the low-power mode signal LOWPWR is at low level; thus, the mode set is the normal mode. The output of the AND circuit 76 is at low level; thus, the second counter 71 is in a reset state and the output C is at high level. Thus, the D flip-flop 75 is in a reset-released state.

In the burst disabled state, the control pulse signal OUT is generated. When, at time point t1, the counter 70 has counted four pulses in the control pulse signal OUT, a signal now at high level is output, and the output OR rises to high level. Thus, the output A falls to low level.

Then, at time point t2, the feedback signal Vfb falls below the burst threshold voltage Vbst1 and the burst enable signal BSTEN falls to low level. This brings the counters 70 and 71 and the D flip-flop 73 into the reset state, turns the output OR to low level, and turns the output A to high level. Here, the output B rises to high level, and with this as a trigger, the output of the Q terminal of the D flip-flop 75 turns to low level. Thus, the normal mode signal NORMAL is at high level, and the mode is set to the normal mode.

Then, at time point t3, the feedback signal Vfb becomes higher than the burst threshold voltage Vbst2; thus, the burst enable signal BSTEN rises to high level and the output B turns to low level. Thus, the first counter 70 and the D flip-flop 73 are released from the reset state.

The first counter 70, which counts the control pulse signal OUT, counts three pulses in the control pulse signal OUT by time point t4 at which the burst enable signal BSTEN falls to low level. Since the count is short of four pulses in the control pulse signal OUT, between time points t3 to t4, the output OR remains at low level and the output A remains at high level.

Thus, when the output B rises to high level at time point t4, triggered by this, the output from the Q terminal of the D flip-flop 75 turns to high level. Thus, the normal mode signal NORMAL turns to low level, and the mode is changed to the low-power mode. That is, a light load is detected by the number of pulses in the control pulse signal OUT being equal to or less than three, and the mode is changed to the low-power mode.

At time point t4, the burst enable signal BSTEN turns to low level. This brings the counters 70 and 71 and the D flip-flop 73 into the reset state, turns the output OR to low level, and turns the output A to high level.

Then, at time point t5, the feedback signal Vfb becomes higher than the burst threshold voltage Vbst2; thus, the burst enable signal BSTEN rises to high level and the output B turns to low level. Thus, the first counter 70 and the D flip-flop 73 are released from the reset state. The output AND rises to high level, and the second counter 71 is released from the reset state. After time point t5, the minimum on-period in switching based on the generated control pulse signal OUT in the switching transistor M changes from the first minimum on-period Tmin1 to the second minimum on-period Tmin2.

The second counter 71, which counts the control pulse signal OUT, counts one pulse in the pulse signal OUT by time point t6 at which the burst enable signal BSTEN falls to low level. Since the count is short of two pulses in the control pulse signal OUT, between time points t5 to t6, the output from the Q terminal of the D flip-flop FF12 remains at low level and the output C remains at high level.

The number of pulses in the control pulse signal OUT counted by the first counter 70 between time points t5 and t6 is one and has not reached four; thus, the output A remains at high level between time points t5 and t6.

Thus, at time point t6 at which the burst enable signal BSTEN falls to low level, the output B rises to high level, and, triggered by this, the output from the Q terminal of the D flip-flop 75 turns to high level. Thus, the normal mode signal NORMAL turns to low level, and the mode remains in the low-power mode.

Then, when, at time point t7, the burst enable signal BSTEN rises to high level, the output AND rises to high level, and the second counter 71 is released from the reset state. Then, when, at time point t8, the second counter 71 counts two pulses in the control pulse signal OUT, the output from the Q terminal in the D flip-flop FF12 rises to high level. Thus, the output C turns to low level, the D flip-flop 75 is reset, and the normal mode signal NORMAL turns to high level. Thus, the mode is reset to the normal mode. Thus, after time point t8, the minimum on-period in switching based on the generated control pulse signal OUT in the switching transistor M is reset to the first minimum on-period Tmin1.

Here, the output OR rises to high level, and, triggered by this, the output A falls to low level. With the D flip-flop 75 reset, the output AND falls to low level; thus, the second counter 71 is reset, the output OR falls to low level, and the output C rises to high level.

When, at time point t9, the burst enable signal BSTEN falls to low level and the output B rises to high level, triggered by this, the normal mode signal NORMAL turns to high level.

Modified Example of the Mode Setter

Figure 6:
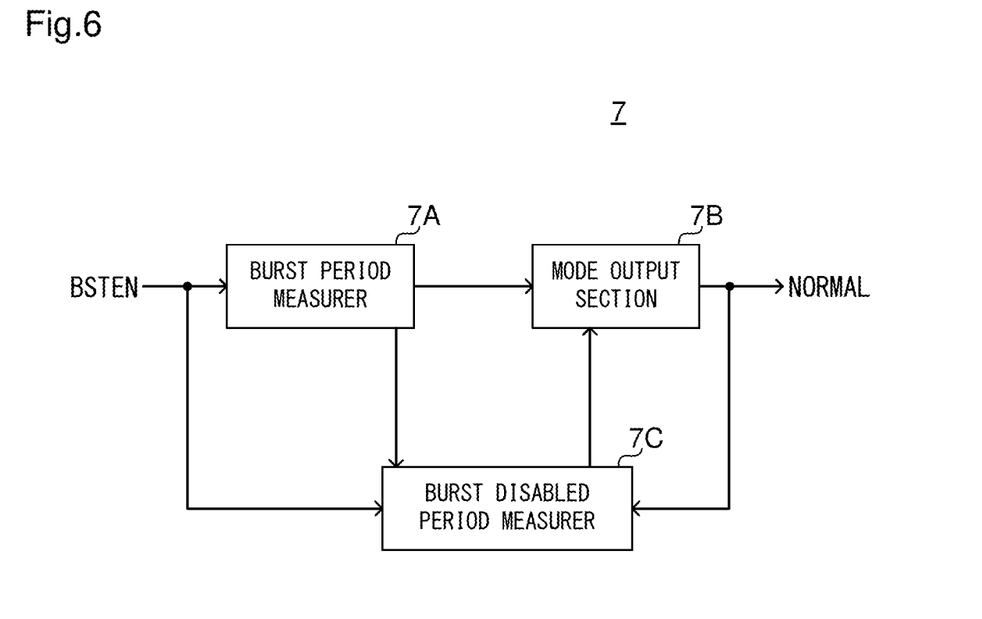
FIG. 6 is a block diagram showing the configuration of the mode setter according to one modified example.

FIG. 6 is a block diagram showing the configuration of the mode setter 7 according to one modified example. The mode setter 7 shown in FIG. 6 includes a burst period measurer 7A, a mode output section 7B, and a burst disabled period measurer 7C. The mode setter 7 shown in FIG. 6 does not need to be fed with the control pulse signal OUT.

The burst period measurer 7A measures the burst period based on the burst enable signal BSTEN. The burst period is, as described above, a unit period comprising the burst disabled period and the burst enabled period. The burst period measurer 7A measures, for example, the length of time after the burst enable signal BSTEN turns to high level until it turns back to high level.

The burst disabled period measurer 7C measures the burst disabled period. That is, the burst disabled period measurer 7C measures the period during which switching is performed in the switching transistor M.

The mode output section 7B, based on the results of measurement by the burst period measurer 7A and the burst disabled period measurer 7C, sets the level of the normal mode signal NORMAL.

Figure 7:
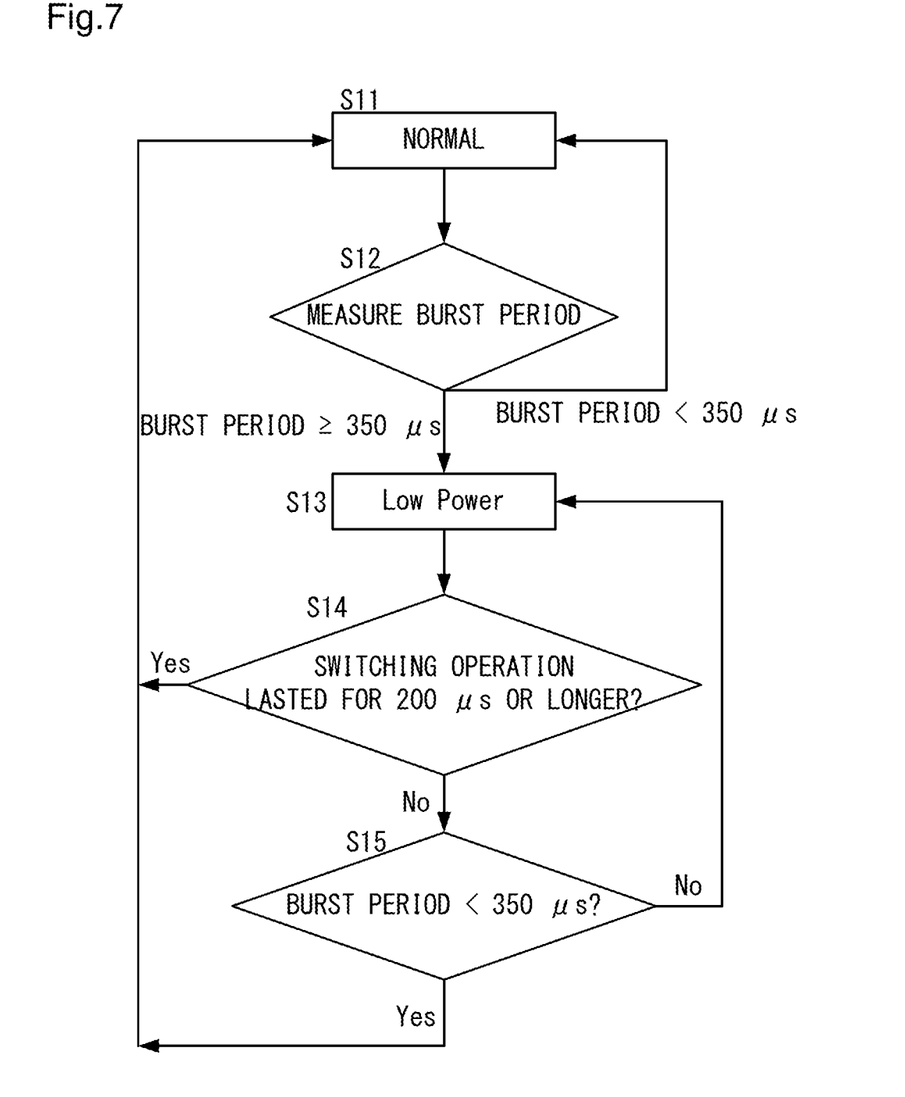
FIG. 7 is a flow chart illustrating a procedure of the operation of the mode setter shown in FIG. 6.

FIG. 7 is a flow chart illustrating a procedure of the operation of the mode setter 7 shown in FIG. 6. First, in step S11, the mode is set to the normal mode. In step S12, the burst period measurer 7A measures the burst period. If the burst period measured is shorter than a first predetermined time (here, for one example, 350 μs), the procedure returns to step S11. The mode output section 7B keeps the normal mode signal NORMAL at high level, and the normal mode is maintained. By contrast, if the burst period measured is equal to or longer than the first predetermined time, it is judged that a light load has been detected; thus, the mode output section 7B turns the normal mode signal NORMAL to low level and changes the mode to the low-power mode (step S13).

As the normal mode signal NORMAL turns to low level, the burst disabled period measurer 7C starts to measure the burst disabled period. If the burst disabled period measured is equal to or longer than a second predetermined time (here, for one example, 200 μs) (Yes in step S14), the procedure returns to step S11, where the mode output section 7B turns the normal mode signal NORMAL to high level, and the mode is changed to the normal mode. In this way, when, for example, the load becomes heavy abruptly, it is possible to reset the mode to the normal mode.

By contrast, if the burst disabled period measured is shorter than the second predetermined time (No in step S14), the procedure proceeds to step S15. Here, if the burst period measured by the burst period measurer 7A is equal to or longer than the first predetermined time (No in step S15), the procedure returns to step S13, where the mode output section 7B maintains the low-power mode. By contrast, if the burst period measured is shorter than the first predetermined time (Yes in step S15), the procedure returns to step S11, where the mode output section 7B changes the mode to the normal mode.

Here, compared to the modified example shown in FIG. 6, the configuration shown in FIG. 4 described earlier is more advantageous in terms of accuracy in detecting a light load.

<Setting the Minimum On-Period Based on the Alternating-Current Voltage Level>

When the switching transistor M is turned on, the current Id that passes through the switching transistor M increases with a temporal gradient given by the following formula.

$$Id/Ton = Vin/Lp$$

(where Ton represents the on-period, and Lp represents the inductance of the primary winding W1)

Accordingly, as Vin decreases, the temporal gradient of Id becomes gentler; thus, to increase Id up to a predetermined current value after turning-on, it is necessary to increase the minimum on-period. Thus, as described earlier, the alternating-current voltage detector 3 senses the peak voltage of the high voltage Vh to sense the level of Vin, and the minimum on-period setter 5 sets the minimum on-period in accordance with the sensed peak voltage. For example, compared to when the alternating-current voltage Vac is 230V, when it is AC 100V, the peak voltage is lower, and thus the minimum on-period is set longer.

The alternating-current voltage detector 3 may detect the peak voltage of the output of the diode bridge 25.

<Others>

The above embodiments should be understood to be in every aspect illustrative and not restrictive. The technical scope of the present invention is defined not by the description of the embodiments given above but by the appended claims, and should be understood to encompass any modifications made in the sense and scope equivalent to those of the claims.

For example, the mode setter 7 may count the number of pulses in the gate signal Gt instead of that in the control pulse signal OUT. The numbers of pulses are equal between the gate signal Gt and the control pulse signal OUT; thus, counting the number of pulses in the gate signal Gt is equivalent to counting the number of pulses in the control pulse signal OUT.

INDUSTRIAL APPLICABILITY

The present invention finds applications in, for example, AC-DC converters.

LIST OF REFERENCE SIGNS 1 power control device
2 starting circuit
3 alternating-current voltage detector
4 pull-up resistor
5 minimum on-period setter
6 pull-up resistor
7 mode setter
70 first counter
71 second counter
7A burst period measurer
7B mode output section
7C burst disabled period measurer
8 minimum on-period counter
9 burst comparator
10 control pulse generator
11 driver 12 OCP comparator
25 diode bridge
30 photocoupler
301 light emitting element
302 light receiving element
35 shunt regulator
100 AC-DC converter
100A flyback converter
M switching transistor
D1 to D4 diode
C1 capacitor
C2 smoothing capacitor
C3 output capacitor
R1 resistor
R11, R12 voltage division resistor
R21, R22 resistor
T1 transformer
W1 primary winding
W2 secondary winding
W3 auxiliary winding
Rcs sense resistor
Rset setting resistor
P1 input terminal
P2 output terminal
FBC feedback circuit

The invention claimed is:

1. A power control device for use in an insulation-type DC-DC converter,
wherein
the DC-DC converter includes:
a transformer having a primary winding and a secondary winding; and
a switching transistor connected to the primary winding,
the power control device includes:
a control pulse generator configured to generate a control pulse signal with a duty in accordance with a feedback signal generated based on an output voltage of the DC-DC converter to drive and control the switching transistor based on the control pulse signal; and
a burst comparator configured to compare the feedback signal with a threshold value to generate a burst enable signal as a comparison result,
the control pulse generator is configured to alternate between driving and not driving the switching transistor in accordance with a level of the burst enable signal to perform a burst operation in which switching is performed intermittently in the switching transistor, and
the power control device further includes:
a mode setter configured to, upon detecting a light load in the burst operation, change a mode from a normal mode to a low-power mode; and
a minimum on-period setter configured to, when the mode is changed to the low-power mode, change a minimum on-period of the switching transistor from a first minimum on-period to a second minimum on-period longer than the first minimum on-period.

2. The power control device according to claim 1, wherein the mode setter is configured to detect the light load by counting a number of pulses in the control pulse signal during a burst disabled period in which the switching transistor is driven.

3. The power control device according to claim 2, wherein the mode setter is configured to, after the mode is changed to the low-power mode, count the number of pulses in the control pulse signal during the burst disabled period and, when the number of pulses reaches a predetermined number, change the mode to the normal mode immediately.

4. The power control device according to claim 2, wherein the mode setter includes:
a first counter configured to count the number of pulses to switch between a reset state and a reset-released state in accordance with the burst enable signal;
a first D flip-flop having
a clock terminal fed with a signal based on an output of the first counter,
a D terminal fed with a supply voltage, and
a reset terminal fed with the burst enable signal;
a first inverter configured to invert a level of a Q output of the first D flip-flop;
a second inverter configured to invert a level of the burst enable signal; and
a second D flip-flop having
a D terminal fed with an output of the first inverter and
a clock terminal fed with an output of the second inverter.

5. The power control device according to claim 4, wherein the mode setter further includes:
an AND circuit fed with the burst enable signal and a Q output of the second D flip-flop;
a second counter configured to count the number of pulses to switch between a reset state and a reset-released state in accordance with an output of the AND circuit;
a third inverter configured to invert a level of an output of the second counter; and
an OR circuit fed with the outputs of the first and second counters,
an output of the OR circuit is fed to the clock terminal of the first D flip-flop, and
an output of the third inverter is fed to a reset terminal of the second D flip-flop.

6. The power control device according to claim 1, wherein the mode setter is configured to detect the light load by measuring a burst period comprising the burst disabled period in which the switching transistor is driven and a burst enabled period in which the switching transistor is not driven.

7. The power control device according to claim 6, wherein the mode setter is configured to, after the mode is changed to the low-power mode, start to measure the burst disabled period and, if the burst disabled period measured is equal to or longer than a predetermined time, change the mode to the normal mode.

8. The power control device according to claim 1, further comprising an alternating-current voltage detector configured to detect a level of an alternating-current voltage fed in to a stage preceding the DC-DC converter,
wherein the minimum on-period setter is configured to set the minimum on-period in accordance with the level of the alternating-current voltage detected.

9. A DC-DC converter of a flyback type comprising a transformer, a switching transistor, and the power control device according to claim 1.

10. An AC-DC converter including a diode bridge fed with an alternating-current voltage, a capacitor provided in a stage succeeding the diode bridge, and the DC-DC converter according to claim 9.

* * * * *